United States Patent
Metz et al.

(12)

(10) Patent No.: US 9,394,945 B2
(45) Date of Patent: Jul. 19, 2016

(54) BEARING ARRANGEMENT

(75) Inventors: Dietmar Metz, Meckenheim (DE); Martin Mueller, Speyer (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/237,374

(22) PCT Filed: Aug. 17, 2012

(86) PCT No.: PCT/US2012/051319
§ 371 (c)(1),
(2), (4) Date: Feb. 6, 2014

(87) PCT Pub. No.: WO2013/028507
PCT Pub. Date: Feb. 28, 2013

(65) Prior Publication Data
US 2014/0185969 A1    Jul. 3, 2014

(30) Foreign Application Priority Data

Aug. 24, 2011  (DE) .......................... 10 2011 111 699
Sep. 21, 2011  (DE) .......................... 10 2011 113 970
Feb. 27, 2012  (DE) .......................... 10 2012 003 911

(51) Int. Cl.
*F16C 17/04*  (2006.01)
*F16C 37/00*  (2006.01)
*F16C 17/02*  (2006.01)
(Continued)

(52) U.S. Cl.
CPC .............. *F16C 37/002* (2013.01); *F01D 25/22* (2013.01); *F16C 17/024* (2013.01); *F16C 17/042* (2013.01); *F02B 37/10* (2013.01); *F02B 39/10* (2013.01); *F05D 2220/40* (2013.01); *F16C 2360/24* (2013.01); *F16C 2360/44* (2013.01)

(58) Field of Classification Search
CPC .... F16C 17/024; F16C 17/042; F16C 37/002; F16C 2360/44; F16C 2360/24; F01D 25/22; F05D 2220/40; F02B 37/10; F02B 39/10
USPC .......... 384/119, 103–106, 107; 415/116, 177, 415/229; 417/321
See application file for complete search history.

(56) References Cited

U.S. PATENT DOCUMENTS 4,549,821 A * 10/1985 Kawakami .................... 384/103
4,552,466 A * 11/1985 Warren ......................... 384/103
(Continued)

FOREIGN PATENT DOCUMENTS

DE   102011115249 A1 *  3/2013
EP       2412994 A2  *  2/2012
(Continued)

OTHER PUBLICATIONS

International Search Report PCT/US2012/051319, dated Mar. 4, 2013.

*Primary Examiner* — Marcus Charles
(74) *Attorney, Agent, or Firm* — A. Michael Tucker; Stephan A. Pendorf; Patent Central LLC

(57) ABSTRACT

A bearing arrangement (28) having at least one radial air bearing (1) and/or having an axial air bearing (15'). The radial air bearing (1) has an inner annular bearing plate (7) and a spring plate (10) which surrounds the bearing plate (7) at the outside. The bearing plate and spring plate being formed as a single-piece component.

9 Claims, 7 Drawing Sheets

(51) Int. Cl.
*F01D 25/22* (2006.01)
*F02B 37/10* (2006.01)
*F02B 39/10* (2006.01)

(56) References Cited

U.S. PATENT DOCUMENTS

| | | | |
|---|---|---|---|
| 4,624,583 A | 11/1986 | Saville et al. | |
| 4,767,222 A * | 8/1988 | Paletta et al. | 384/106 |
| 5,902,049 A * | 5/1999 | Heshmat | 384/106 |
| 5,911,510 A * | 6/1999 | Saville | 384/103 |
| 5,961,217 A | 10/1999 | Heshmat | |
| 7,494,282 B2 * | 2/2009 | Lee | 384/106 |
| 2005/0013515 A1 | 1/2005 | Nakata | |
| 2006/0018574 A1 * | 1/2006 | Kang et al. | 384/106 |
| 2006/0062500 A1 * | 3/2006 | Struziak et al. | 384/106 |
| 2008/0246281 A1 * | 10/2008 | Agrawal et al. | 290/52 |
| 2008/0253705 A1 * | 10/2008 | Struziak et al. | 384/106 |
| 2011/0052110 A1 * | 3/2011 | Kim | 384/106 |
| 2011/0243485 A1 * | 10/2011 | Kume et al. | 384/106 |
| 2011/0243762 A1 * | 10/2011 | Daikoku et al. | 417/321 |
| 2012/0207585 A1 * | 8/2012 | Anderson | 415/116 |

FOREIGN PATENT DOCUMENTS

| | | | | |
|---|---|---|---|---|
| JP | 2009264567 A * | 9/1999 | | |
| JP | 2002061645 A * | 2/2002 | | F16C 27/02 |
| JP | 3463026 B2 * | 11/2003 | | |
| JP | 2005036866 A | 2/2005 | | |
| JP | 2006329321 A | 12/2006 | | |
| KR | 100604132 B1 * | 7/2006 | | F16C 32/06 |
| KR | 1020100095237 A | 8/2010 | | |
| KR | 100964883 B1 * | 8/2012 | | F16C 32/06 |

* cited by examiner

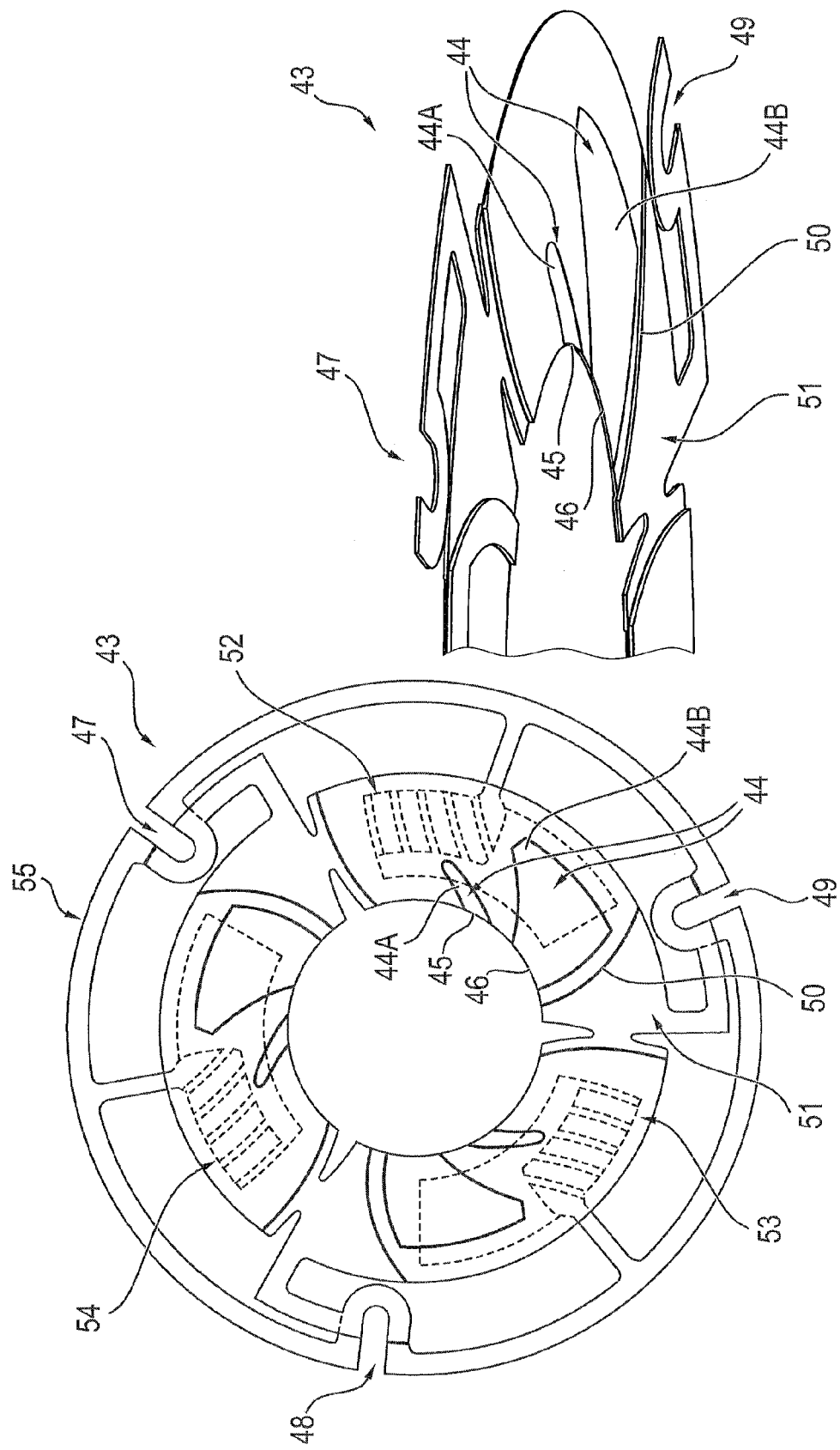

BEARING ARRANGEMENT

CROSS REFERENCE TO RELATED APPLICATIONS

The present application is a national stage entry of PCT/US2012/051319 filed Aug. 17, 2012, which claims priority from DE patent application 102011111699.4 filed Aug. 24, 2011, DE patent application 102011113970.6 filed Sep. 21, 2011 and DE patent application 102012003911.5 filed Feb. 27, 2012.

BACKGROUND OF THE INVENTION

1. Field of the Invention

The invention relates to a bearing arrangement having at least one radial air bearing and optionally additionally an axial air bearing.

2. Description of the Related Art

Bearing arrangements of this type having at least one radial air bearing optionally additionally an axial air bearing are used in particular with rotating parts which have very high rotational speeds.

One known bearing arrangement has for this purpose a radial air bearing which has an inner slotted bearing plate which can for example be arranged around a shaft.

On the outer side of the bearing plate there is provided a separate spring plate which surrounds the bearing plate and which, in the rest state, the bearing plate presses against the outer surface of the shaft.

When the shaft starts to rotate, an air cushion begins to build up between the outer surface of the shaft and the inner surface of the bearing plate, such that the bearing plate is lifted from the shaft counter to the pressure of the spring plate and the shaft is thus mounted in a virtually wear-free manner by means of the air cushion. Here, the bearing plate and the spring plate may be arranged for example in an outer bearing sleeve or, such as is the case for example in turbochargers, directly in the bearing housing without the provision of an additional bearing sleeve.

It is an object of the present invention to provide a bearing arrangement of the type specified in the preamble of claim 1 which is of simpler construction and is simpler to assemble.

BRIEF SUMMARY OF THE INVENTION

According to the principles of the present invention, therefore, it is provided that the bearing plate and the spring plate of the radial air bearing are formed as a single-piece component. For this purpose, it is for example possible for an elongate plate strip to be bent, wherein that plate strip portion which is then at the outside has imparted to it a corrugated structure in order to form the spring plate.

BRIEF DESCRIPTION OF THE SEVERAL VIEWS OF THE DRAWINGS

Further details, features and advantages of the invention will emerge from the following description of exemplary embodiments on the basis of the drawing, in which:

FIGS. 9-11 show illustrations of a further embodiment of an axial air bearing.

DETAILED DESCRIPTION OF THE INVENTION

Figure 1:
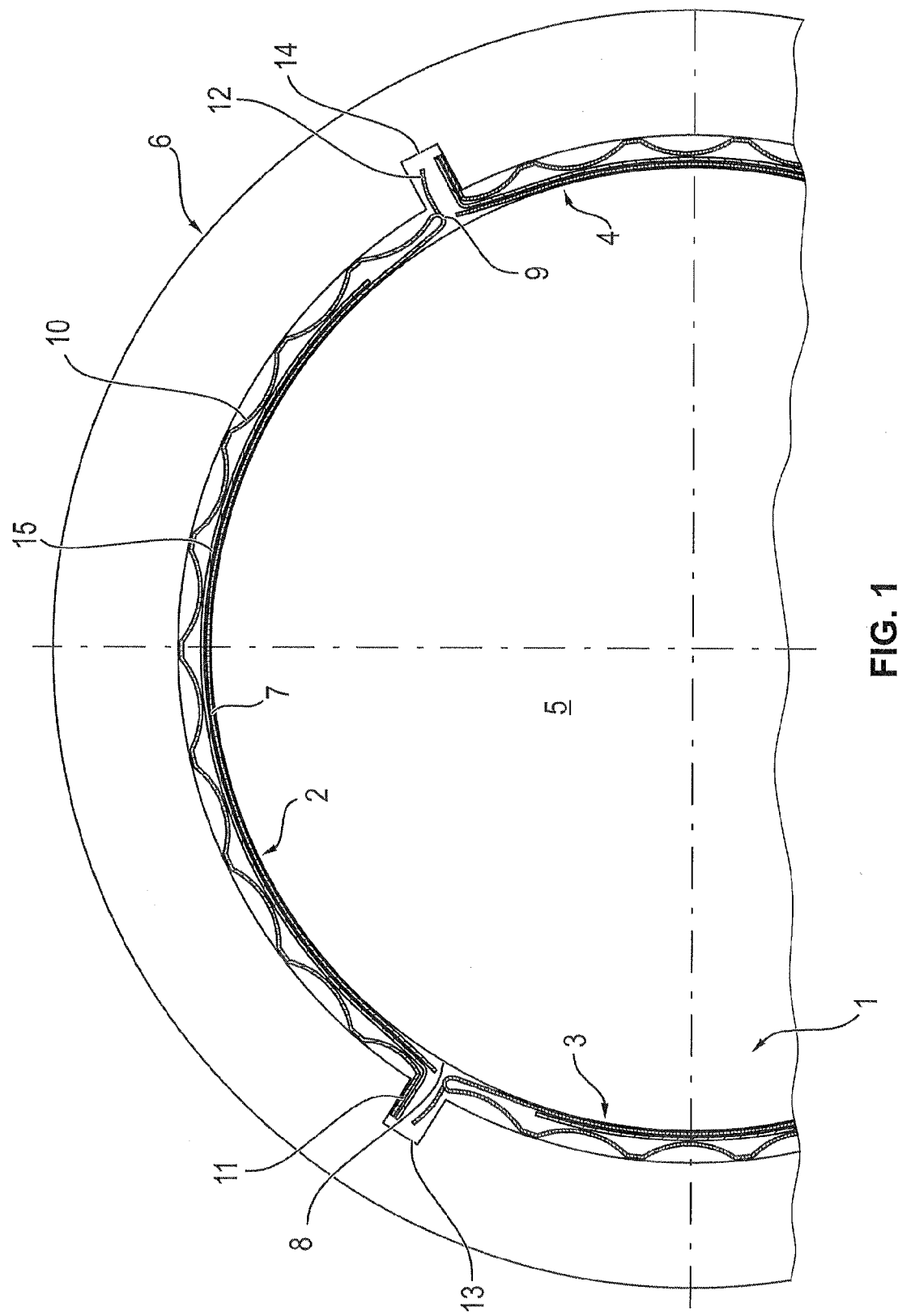
FIG. 1 shows a schematically slightly simplified partial view of a radial air bearing according to the invention, which in the example is divided into three plate portions.

FIG. 1 shows a partial view of a radial air bearing 1 according to the invention, the radial air bearing being composed, in the example, of three plate portions 2, 3 and 4 which, in the assembled state of the air bearing 1 illustrated in FIG. 1, form a bearing ring which, in the example, is arranged around a shaft 5 and is guided in a bearing bush or in a bearing housing 6.

Since the plate portions 2, 3 and 4 are in each case of identical construction, reference will be made below only to the plate portion 2 as a representative for all of the plate portions 2 to 4. As shown in FIG. 1, the plate portion 2 has an inner bearing plate 7 which is of bent form corresponding to the diameter of the shaft 5, such that, in the assembled state shown in FIG. 1, the inner bearing plate can rest against the outer circumference 8 of the shaft 5 when the latter is not rotating. The bearing plate 7 is connected via a bent connecting portion 9 to an outer spring plate 10, such that the bearing plate 7 and the spring plate 10 form a single-piece component. The design can also be seen from the detail illustration of FIG. 2.

Figure 2:
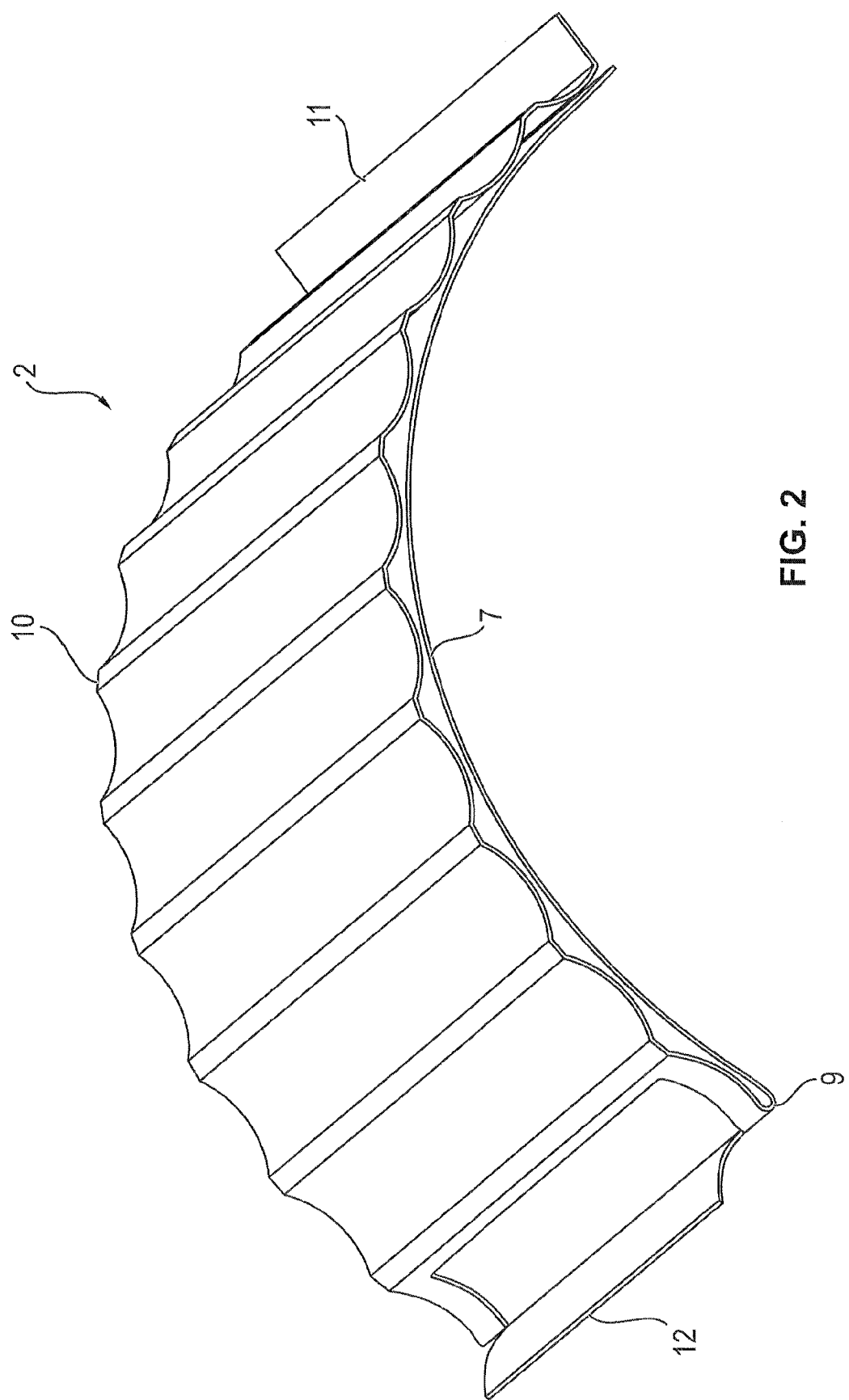
FIG. 2 shows a perspective illustration of one of the plate portions from FIG. 1.

Viewing FIGS. 1 and 2 together, it can be seen that the plate portion 2 is provided, at its end regions, with in each case one retaining lug 11 and 12 respectively which project outwards and thus point away from the shaft 5. Here, the retaining lug 11 is a plate strip which is bent away from the spring plate 10, whereas the retaining lug 12 is formed by punching out a part of the spring plate in the region of the connecting portion 9, the said part likewise being bent outward after being punched out.

FIG. 1 shows that the retaining lugs 11 and 12 engage into recesses 13 and 14 respectively in order to fix the position of the plate strip 2. The recesses 13 and 14 are arranged in the bearing bush or in the surrounding bearing housing 6.

As is also shown in FIGS. 1 and 2, the spring plate 10 is provided with a corrugation in order to be able to generate the spring action by means of which the bearing plate 7 is pressed against the outer circumference 8 of the shaft 5 when the latter is in the rest state.

In the particularly preferred embodiment illustrated in FIG. 1, there is also provided an intermediate layer 15, the bend of which corresponds to the bend of the bearing plate 7 and which is arranged between the bearing plate 7 and the spring plate 10 in order to prevent the corrugation of the spring plate 10 from being pressed into the bearing plate 7. Furthermore, the intermediate layer 15, by generating friction, serves for bearing damping.

As already explained in the introduction, it is provided according to the invention that the radial air bearing 1 is constructed either by means of a single (then in the form of an open ring similar to a shaft seal) plate arrangement (spring plate 10, bearing plate 7 and if appropriate intermediate layer 15), or that the radial air bearing 1 is divided into at least two, preferably three plate portions 2, 3 and 4 as is provided and illustrated in the particularly preferred embodiment of FIG. 1.

As explained in the introduction, the bearing plate 7 rests on the outer circumference 8 of the shaft 5 when the latter is in the rest position.

When the shaft 5 starts to rotate, an air cushion is built up between the bearing plate 7 and the outer circumference 8 of the shaft 5, such that the bearing plate 7 lifts up from the outer circumference 8 of the shaft 5 counter to the pressure of the spring plate 10, and as a result the shaft 5 is mounted by means of the air cushion built up between the outer circumference 8 and the bearing plate 7.

Figure 3:
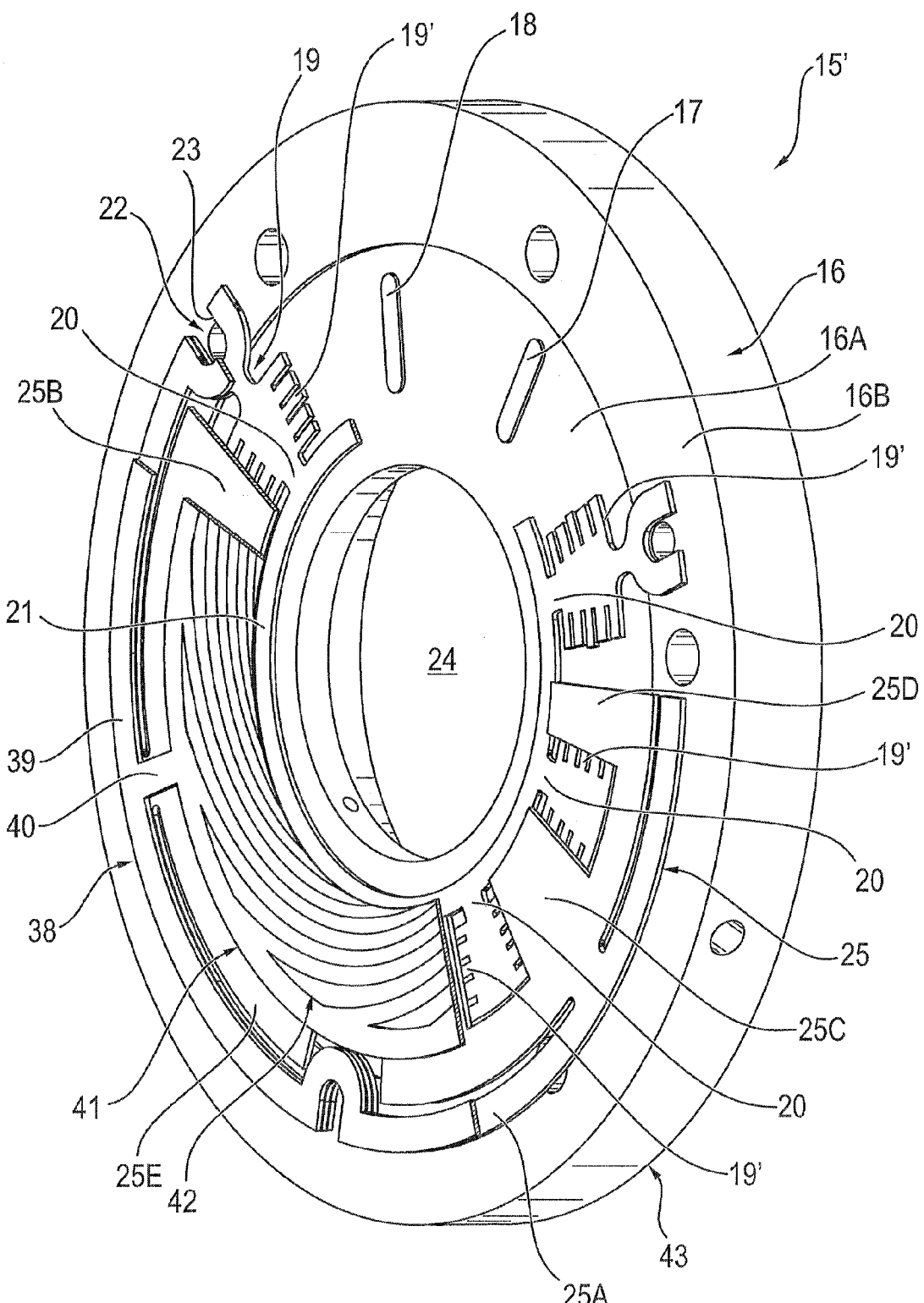
FIG. 3 shows a perspective illustration of an axial air bearing according to the invention.

An axial air bearing has the same mode of operation, wherein a preferred embodiment of the axial air bearing according to the invention is illustrated in FIG. 3 and is denoted by the reference symbol 15'.

The axial air bearing 15' has a carrier plate or a bearing plate 16 which is in the form of an annular disk and which is provided with a multiplicity of protuberances 17, 18, wherein of the multiplicity of protuberances, only the protuberances 17, 18 are visible in FIG. 3. For this purpose, the bearing plate 16 has an inner annular region 16A and, concentrically surrounding the latter at the outside, an outer annular region 16B. To form the protuberances 17 and 18, the inner annular region 16A is milled out such that the protuberances 17 and 18 project as raised webs relative to the milled-out inner annular region 16A.

On the bearing plate 16 there rests a spring plate 19 which, in the example, is constructed from a multiplicity of spring plate portions, of which those spring plate portions which are visible in FIG. 3 are denoted by the reference symbol 19'. The spring plate portions 19' are in turn connected via webs 20 to an inner ring 21.

As is also shown in the figure, the axial air bearing 15' has, in the example, three rotation prevention means arranged on the outer circumference, of which one is denoted, as a representative for all of the rotation prevention means, by the reference symbol 22. This rotation prevention means 22 are in the form of recesses 23 which are open on one side and into each of which can engage a pin (not illustrated in any more detail).

The bearing plate 16 and the spring plate 19 self-evidently each have a central recess 24 through which the shaft to be mounted extends in the assembled state.

Figure 4:
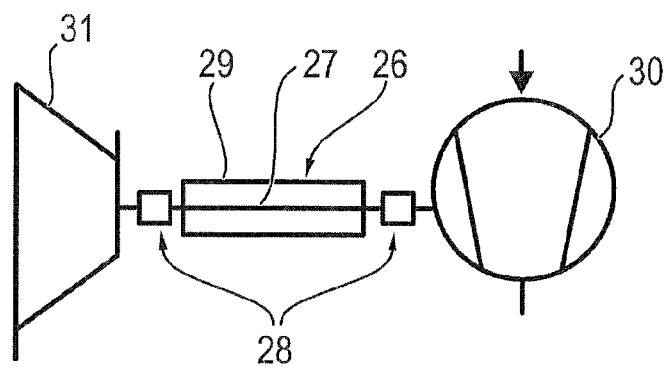
FIGS. 4-8 show possible uses for a bearing arrangement according to the invention.

In the particularly preferred embodiment illustrated in FIG. 4, there is arranged on the spring plate 19 a support plate 25 which has tongues projecting inwardly from an outer ring 25A, of which the tongues 25B to 25D are visible in FIG. 3 and which partially overlap the spring plate 19 in order to build up a spring action and in order to introduce occurring loads as uniformly as possible into a cover plate 38. The spring plate 19 with its spring plate portion 19', the protuberances 17 and 18 and the support plate 25 consequently form an annular spring arrangement on which the cover plate 38 is arranged. Even though the spring arrangement which is formed by the above-explained components 17, 18, 19, 19' and 25 constitutes a particularly preferred embodiment, it is also possible for the spring arrangement to be designed in some other form, for example as a corrugated annular plate. It would be possible for the cover plate 38 to be mounted on the annular plate too.

The cover plate 38 has an outer ring 39 which, as shown in FIG. 3, in the assembled state, covers the outer ring 25A which is connected via a connecting portion 25E to the tongues, as can be seen in detail from the illustration of FIG. 3.

The outer ring 39 of the cover plate 38 is connected via connecting webs to an inner ring 41, wherein owing to the illustration selected in FIG. 3, only one of the webs is visible, the web being denoted by the reference numeral 40.

The inner ring 41 is, as shown in FIG. 3, provided with a spiral arrangement 42 which is constructed from a multiplicity of spiral channels. The design, shown in FIG. 3, of the spiral channels of the spiral arrangement 42 yields, with a shaft assembly of the shaft to be mounted, which shaft assembly rests on the cover plate 38 in the assembled state, an air delivery means by which the air is forced radially outward, that is to say in the direction of the outer edge of the axial bearing 15', in order to build up an air cushion by means of which the shaft assembly of the shaft to be mounted is mounted as it rotates. The spiral channel arrangement illustrated in FIG. 3 constitutes a particularly preferred embodiment of a device for building up an air pressure between the bearing plate 16 and the spring arrangement, which device, as the shaft mounted by means of the axial air bearing 15' rotates, sucks in air and builds up an air cushion between the bearing plate 16 and the spring arrangement, which air cushion, as a result of the abovementioned air pressure build-up, forms a cushion, which is stable during the rotation of the shaft, for mounting the shaft.

As an alternative to this, it would also be possible to provide an external air feed device such as for example in the form of a compressor which is arranged separately from the axial bearing 15' or of a compressor which pumps air from the outside between the spring arrangement and the bearing plate 16 and thereby builds up the air cushion. An example of such an arrangement is the compressor wheel 36 to be explained in detail below on the basis of FIG. 6, which can realize the external feed of air to the axial air bearing.

With regard to the illustration selected in FIG. 3, it must be stated that the bearing plate 16, the spring plate 19, the support plate 25 and the cover plate 38 are self-evidently in each case closed rings, which are however only partially illustrated in FIG. 3 in order to make it possible to illustrate the individual components.

With regard to the arrangement and design of the spiral arrangement 42, reference is hereby made explicitly to the diagrammatic illustration thereof in FIG. 3, wherein it is basically also possible for the particularly preferred embodiment illustrated in FIG. 3 to be modified if this is necessary in one or another usage situation. Instead of the protuberances 17, 18, it is also possible for plate strips to be provided which extend inward in the region of the spring plate portions 19' on the inner ring 21 and can be bent such that, in the bent state, they come to rest under the spring portions 19'. In this case, such bent webs would then, together with the other components 19, 19', 25, form the spring arrangement.

The axial air bearing 15' is, in the fully assembled state for guiding a shaft in both axial directions, self-evidently constructed from in each case two bearing plate/spring plate arrangements which are arranged on both sides of a shaft assembly, as will be explained in more detail below on the basis of the usage examples.

A diagrammatic circuit diagram for possible uses of the air bearing arrangement according to the invention is shown in FIG. 4. In this regard, FIG. 4 shows an electric machine 26 which may be in the form of an electric motor or generator. The shaft 27 of the electric machine 26 is mounted by means of the air bearing arrangement 28 according to the invention, which is symbolized by the two blocks.

If the arrangement is for example an air feed device, the shaft 27 of the electric machine 26 is coupled to a compressor 30 and drives the compressor wheel thereof in order to deliver air.

Optionally, the other end of the shaft 27 may be coupled to a turbine 31, the turbine wheel of which may for example be driven by the exhaust-gas flow of an engine or of some other combustion chamber.

Figure 5:
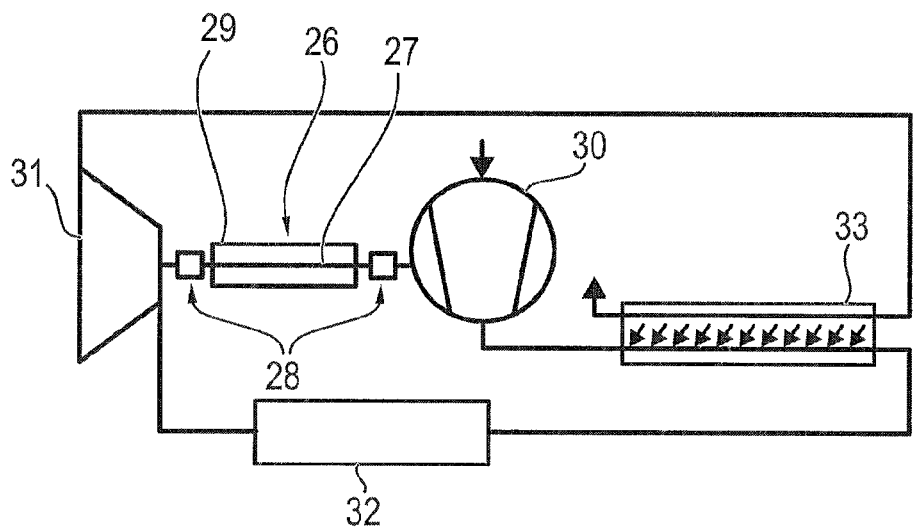

The abovementioned basic principle can also be found in the embodiment as per FIG. 5, which illustrates a so-called "range extender" which serves for increasing the range of vehicles, in particular automobiles, which are driven by means of electric motors.

In this example, too, an air bearing arrangement 28 according to the invention may be provided. As shown in FIG. 5, in addition to the components explained with regard to FIG. 4, the range extender is provided with a combustion chamber 32 in which fuel can be burned, which fuel can be supplied in the form of the combustion gases generated to the turbine 31 in order to drive the turbine wheel. In this case, the electric machine 29 is in the form of a generator and can be used for electrical power generation in order to charge the batteries by means of which the electric motor drive of the vehicle (not illustrated in FIG. 5) can be used. In the embodiment illustrated in FIG. 5, the generator 29 is furthermore connected to the compressor 30 which in turn supplies the compressed combustion air via a recuperator 33 to the combustion chamber 32.

Figure 6:
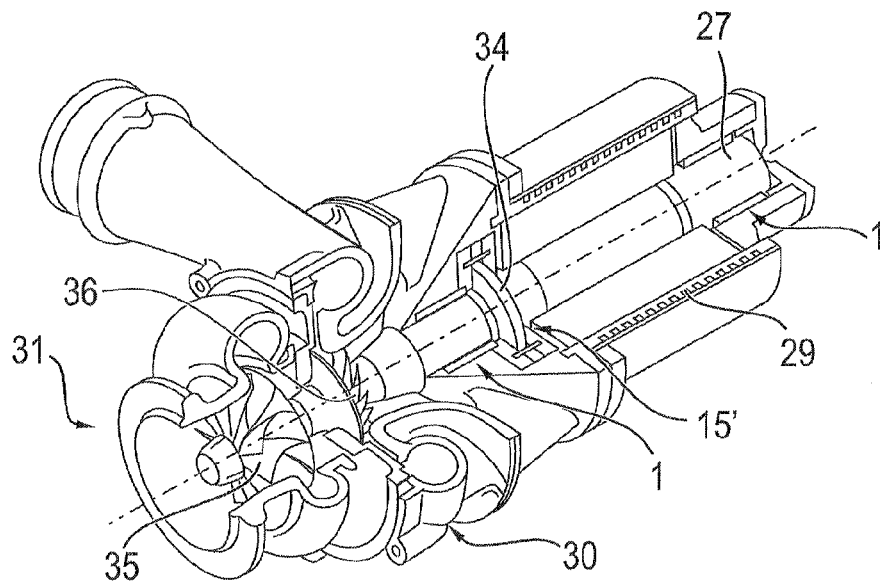

FIG. 6 shows structural details of one possibility for the practical realization of the diagrammatic illustrations of FIGS. 4 and 5.

From the illustration of FIG. 6, it is clear that the bearing arrangement 28 according to the invention is provided, in the example, with two radial air bearings 1 according to the invention and one axial air bearing 15' according to the invention, the two disk packs of which are arranged, as explained above on the basis of FIG. 3, on both sides of a shaft assembly 34 in order to be able to mount the shaft 27 in both axial directions by means thereof.

In the embodiment illustrated in FIG. 6, it must be emphasized that the electric machine 26 is separated from the turbine 31 by the compressor 30, which yields the advantage that the high temperatures which inevitably prevail in the turbine 31 cannot be transmitted to the electric machine 26.

This yields an arrangement of a turbine wheel 35 and compressor wheel 36 of the turbine 31 and of the compressor 30 "back to back", as shown in detail in the illustration of FIG. 6.

In this arrangement, the bearing arrangements 1 and 15' are arranged in the housing of the electric machine 26, as shown in FIG. 6.

Figure 7:
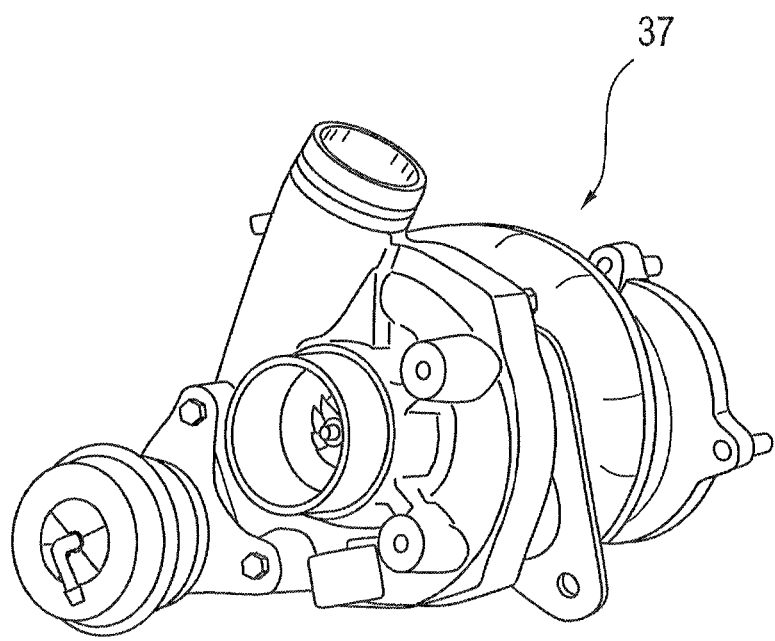
Figure 8:
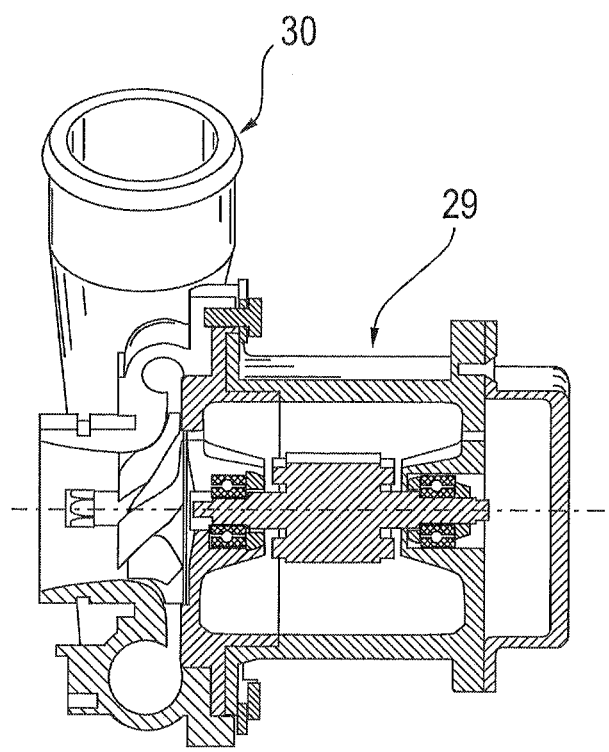

Further possible uses for the bearing arrangement 28 according to the invention with at least one radial air bearing 1 and one axial air bearing 15 are shown in FIGS. 7 and 8.

Here, FIG. 7 shows a conventional exhaust-gas turbocharger 37 which may be provided either with two radial air bearings and one axial air bearing or else is only partially mounted by means of air bearings, because it is for example possible for two radial air bearings to be combined with one conventional axial bearing. Furthermore, according to the invention, it is likewise possible in principle for only one radial air bearing and one conventional radial bearing to be combined with one another. The bearing combinations could in turn be combined either with a conventional axial bearing or with an axial air bearing.

FIG. 8 shows an electric machine 26 which is combined with a compressor 30 in order to drive the latter, such that the arrangement of FIG. 8 yields an electric charger.

Also possible is the combination of an electric machine in the form of a generator with a turbine. This arrangement may be arranged for example in the exhaust tract of a motor vehicle in order to utilize the energy of the exhaust gases which drive the turbine, which in turn drives the generator in order to generate electrical energy. This arrangement may be provided in a conventional naturally-aspirated engine or else downstream of an exhaust-gas turbocharger in the exhaust tract.

Figure 9:
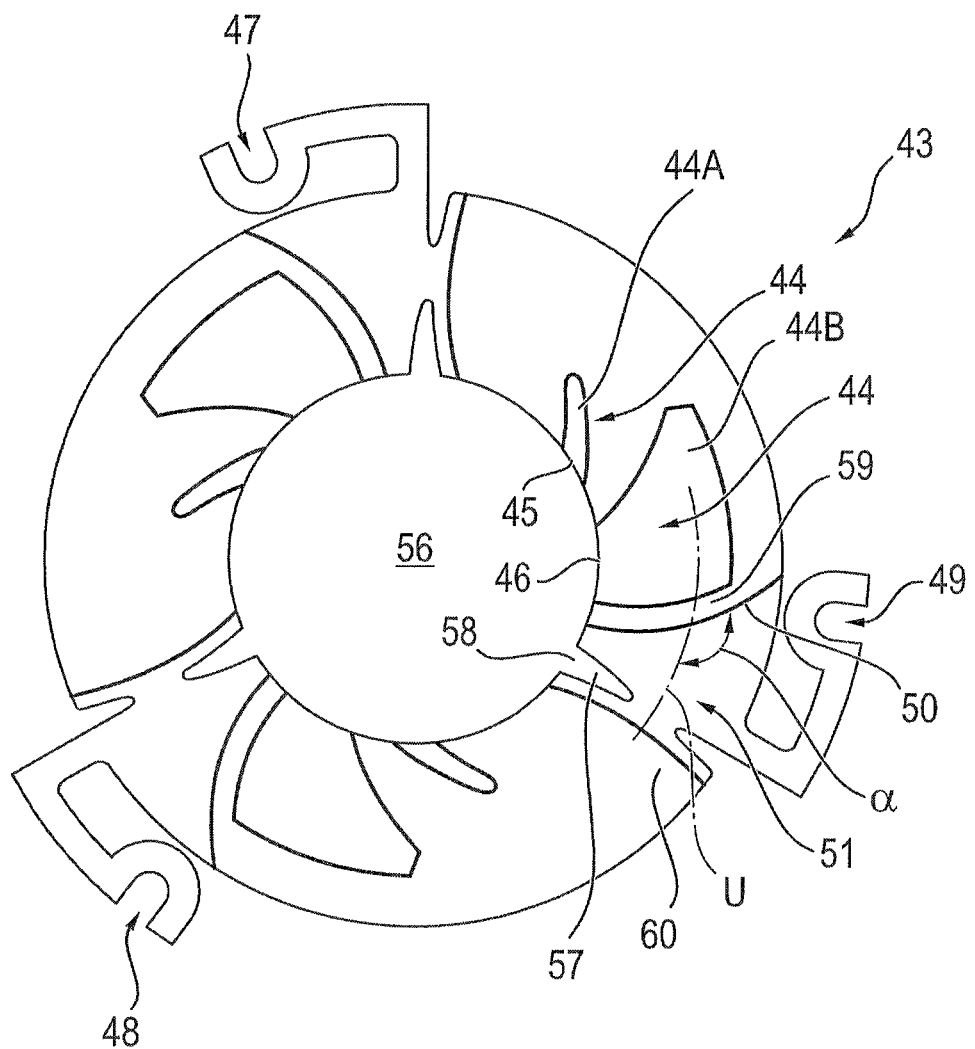

FIGS. 9 to 11 show a further embodiment of an axial air bearing according to the invention, wherein the air bearing is illustrated without the conventional housing parts and is symbolized merely by a carrier plate 43 and a spring plate 55 visible in FIG. 10. The parts are, in the case of an axial air bearing, placed into a housing, wherein in each case two carrier plates and spring plates are arranged in associated housing parts which are arranged on both sides of a central disk connected rotationally conjointly to the shaft to be mounted, wherein the air cushion is built up between the disk and the carrier plate.

Viewing FIGS. 9 to 11 together, it can be seen that, in the particularly preferred embodiment illustrated in the figures, the carrier plate 43 has three injection and admission pressure regions, one of which is denoted by the reference symbol 44 and will be described below as a representative for all of the regions.

The injection and admission pressure region 44 has two sub-regions 44A and 44B which are recessed in relation to the plane of the annular carrier plate 43. The sub-regions 44A and 44B are in each case open, via openings 45 and 46, in the direction of a central recess 56.

Adjacent to the sub-region 44B there is provided a ramp 50 for generating a pumping effect and a pressure build-up. Here, the ramp is of curved form and is formed so as to be inclined relative to a circumferential direction U by an angle α which is greater than 90° and which is preferably in an angle range from 110° to 160°. Adjacent to the ramp 50 there is furthermore provided a slot 57 which is formed so as to be open on one side via an opening 58. Accordingly, the ramp 50 is arranged between the sub-region 44B and the slot 57.

On the outer circumference of the carrier plate 43 there are furthermore provided three rotation prevention means 47, 48 and 49 which interact with rotation prevention pins (not illustrated in any more detail in the drawings) of the housing of the axial air bearing.

In the vicinity of the rotation prevention means 47 and 49 there are provided in each case air-cooling regions, of which one is denoted, as a representative for all of the air-cooling regions, by the reference symbol 51 in FIGS. 9 to 10. The air-cooling regions lie approximately 0.5 mm lower than the surface regions 59 and 60, wherein the surface region 59 is situated between the ramp 50 and the sub-region 44B, and the surface region 60 adjoins the air-cooling region 51, as can be seen in detail from FIG. 9.

FIG. 10 furthermore shows the provision of a spring plate 55 with springs or spring regions 52 to 54, wherein the spring plate 55, in the illustration selected in FIG. 10, is arranged under the carrier plate 43, that is to say under the plane of the drawing of FIG. 10.

Accordingly, the rear side of the carrier plate 43 is of preferably planar form, in particular if the springs or spring regions 52 to 54 were so large as to project into the punched regions, in particular the sub-regions 44A and 44B.

The construction, illustrated in FIGS. 9 to 10, of the axial air bearing according to the invention preferably generates an air circulation which contributes to cooling of the bearing, because the air circulation makes it possible for heat to be dissipated into the surrounding housing.

Furthermore, the curved form of the ramp 50 yields an advantageously stable air pressure build-up and therefore a stable air cushion for mounting the shaft which is provided with the axial air bearing.

The arrangements as per FIGS. 6 to 11 may also be provided with a bearing arrangement according to the invention which comprises the above-explained possible combinations of radial and axial air bearings with or without conventional radial or axial bearings.

It must furthermore be emphasized that the arrangements as per FIGS. 6 to 11 each constitute separate articles according to the invention.

In addition to the above written disclosure of the invention, reference is hereby made explicitly to the diagrammatic illustration thereof in FIGS. 1 to 11.

LIST OF REFERENCE SYMBOLS

1 Radial air bearing
2, 3, 4 Plate portions
5 Shaft
6 Bearing bush or bearing housing
7 Bearing plate
8 Outer circumference of the shaft 5
9 Connecting portion
10 Spring plate
11, 12 Retaining lugs
13, 14 Recesses in the housing or in the bearing bush
15 Intermediate layer
15' Axial air bearing
16 Axial bearing plate
16A Inner ring region
16B Outer ring region
17 Protuberance
18 Protuberance
19 Axial spring plate
19' Spring plate portions
20 Connecting webs
21 Inner ring
22 Rotation prevention means
23 Recess
24 Recess of the bearing plate 16, of the spring plate 19, of the support plate 25 and of the cover plate 38
25 Support plate
25A Outer ring
25B-25D Tongues
25E Connecting region
26 Electric machine (electric motor and/or generator)
27 Shaft
28 Bearing arrangement
29 Generator
30 Compressor
31 Turbine
32 Combustion chamber
33 Recuperator
34 Shaft assembly
35 Turbine wheel
36 Compressor wheel
37 Exhaust-gas turbocharger
38 Cover plate
39 Outer ring
40 Web/connecting web
41 Inner ring
42 Spiral arrangement
43 Carrier plate
44 Injection and admission pressure region
45, 46 Inlet openings
47, 48, 49 Rotation prevention means
50 Ramp
51 Air-cooling region
52, 53, 54 Springs
55 Spring plate
56 Central recess
57 Slot
58 Opening
59, 60 Surface regions of the carrier plate 43

The invention claimed is:

1. A bearing arrangement (28) having
at least one radial air bearing ring (1); and
optionally additionally an axial air bearing (15'),
wherein the radial air bearing ring (1) has an inner annular bearing plate (7) and an outer spring plate (10) along one side of the bearing plate (7), wherein the bearing plate (7) and spring plate (10) are together formed from a single elongate Plate strip with the bearing plate (7) connected via a bent connecting portion (9) to the spring plate (10), such that said bearing plate and spring plate form a single-piece component.

2. The bearing arrangement as claimed in claim 1, wherein the single-piece component constructed from the bearing plate (7) and the spring plate (10) has at least one retaining lug (11, 12).

3. The bearing arrangement as claimed in claim 1, wherein the spring plate (10) is of corrugated form.

4. The bearing arrangement as claimed in claim 1, wherein the at least two plate portions (2, 3, 4) are assembled to form a bearing ring.

5. The bearing arrangement as claimed in claim 1, wherein an intermediate layer (15) is provided between the bearing plate (7) and the spring plate (10).

6. The bearing arrangement as claimed in claim 1, wherein the axial air bearing (15') has an annular bearing plate (16) and an annular spring arrangement (17, 18, 19, 19', 25) on which is arranged a cover plate (38) which is provided with a device (42) for building up air pressure between the bearing plate (16) and the spring arrangement (17, 18, 19, 19', 25).

7. The bearing arrangement as claimed in claim 1, wherein the axial air bearing has an annular carrier plate (43) on which is arranged a curved ramp (50) for building up air pressure.

8. The radial air bearing as claimed in claim 1, wherein the single-piece component constructed from the bearing plate (7) and the spring plate (10) has at least one retaining lug (11, 12).

9. The bearing arrangement as claimed in claim 1, wherein at least three plate portions (2, 3, 4) are assembled to form a bearing ring.

* * * * *